Dec. 16, 1924.
Re. 15,969
F. G. WHITTINGTON
STEERING WHEEL DRIVE FOR SPEEDOMETERS
Original Filed June 5, 1922 3 Sheets-Sheet 1
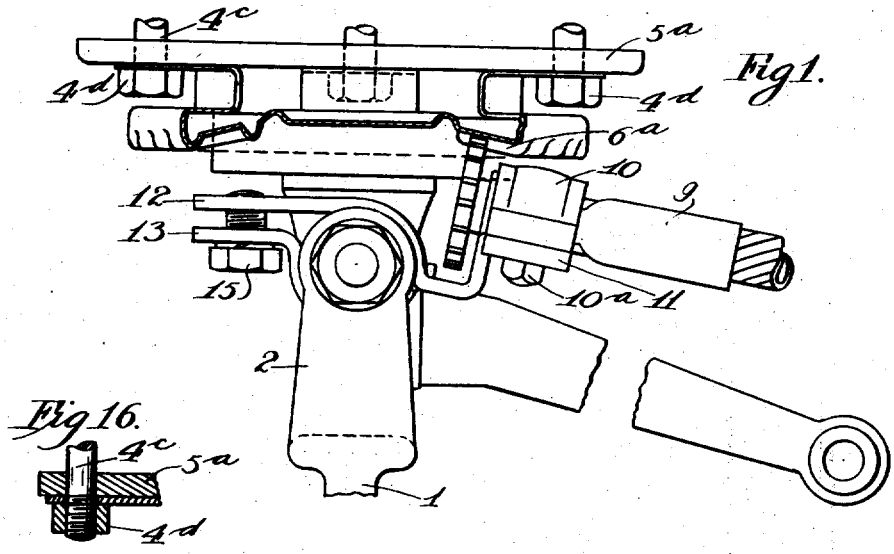
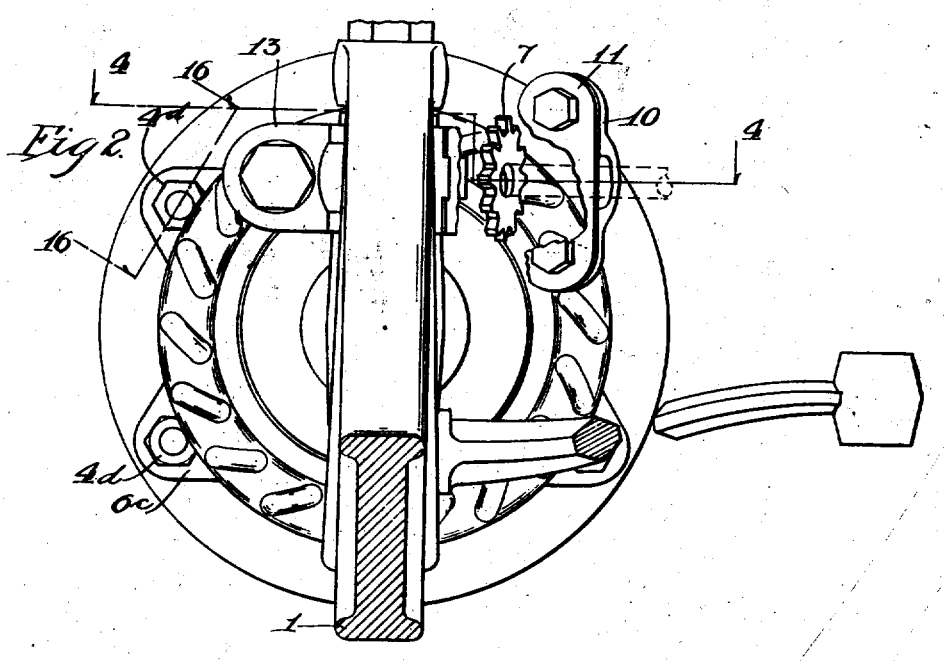
Witness.
H. O. McKnight
Inventor:
Frederick G. Whittington
by Burton & Burton
his Attorneys.

Dec. 16, 1924. Re. 15,969

F. G. WHITTINGTON

STEERING WHEEL DRIVE FOR SPEEDOMETERS

Original Filed June 5, 1922 3 Sheets-Sheet 2

Witness
A. C. McKnight

Inventor
Frederik G. Whittington
by Burton & Burton
his Attorneys.

Dec. 16, 1924. Re. 15,969

F. G. WHITTINGTON

STEERING WHEEL DRIVE FOR SPEEDOMETERS

Original Filed June 5, 1922 3 Sheets-Sheet 3

Witness.
M. O. McKnight.

Inventor.
Frederick G. Whittington.
by Burton & Burton.
his Attorneys.

Reissued Dec. 16, 1924. Re. 15,969

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

STEERING-WHEEL DRIVE FOR SPEEDOMETERS.

Original No. 1,466,865, dated September 4, 1923, Serial No. 565,886, filed June 5, 1922. Application for reissue filed December 14, 1923. Serial No. 680,772.

*To all whom it may concern:*

Be it known that I, FREDERIK G. WHITTINGTON, a citizen of the United States, residing at Chicago, in the county of Cook and State of Illinois, have invented new and useful Improvements in Steering-Wheel Drives for Speedometers, of which the following is a specification, reference being had to the accompanying drawings, forming a part thereof.

The purpose of this invention is to provide an improved construction in driving connections from a front or steering wheel of an automobile for driving a speedometer or other instrument carried on the vehicle. It consists in the elements and features of construction shown and described as indicated in the claims.

In the drawings:—

Figure 1 is a plan view of a portion of the steering wheel and axle of an automobile equipped with the invention shown in outline.

Figure 2 is an inner side elevation of the same part shown in Figure 1, the fixed axle being thereby in vertical section.

Figure 16 is a detail section at the line, 16—16, on Figure 2.

Figure 4:
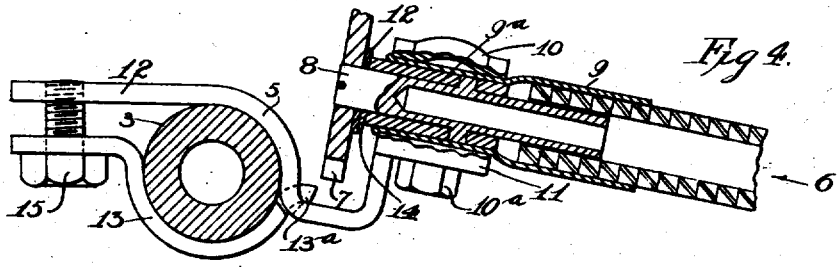
Figure 4 is a section at the line 4—4, on Figures 2 and 3.
Figure 5:
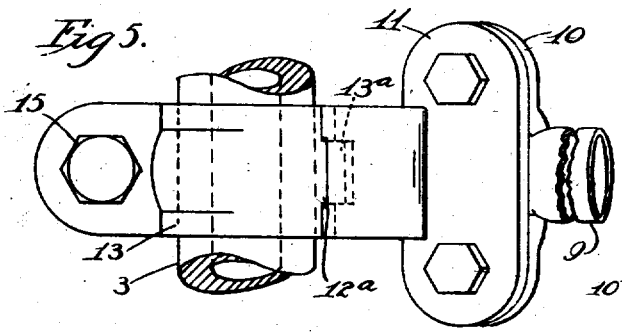
Figure 5 is an elevation looking in the direction of the arrow, 5, on Figure 4.
Figure 6:
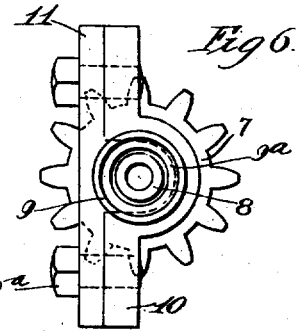
Figure 6 is an elevation looking in the direction of the arrow, 6, on Figure 4.
Figure 3:
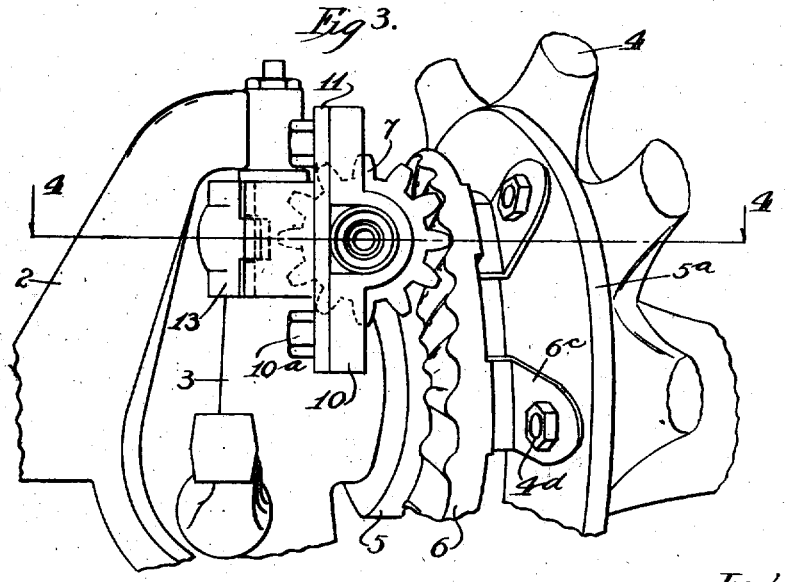
Figure 3 is a view looking in the direction of the arrow, 3, on Figure 1.
Figure 13:
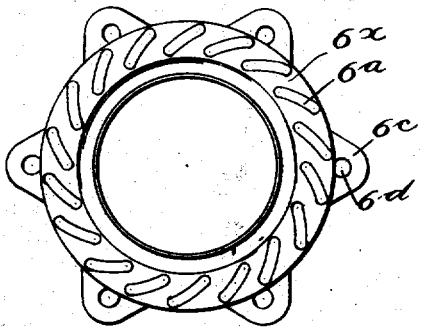
Figure 13 is a face side elevation of the helical gear in a completed form.
Figure 14:
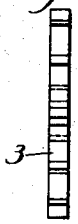
Figures 14 and 15 are respectively an edge view and face view of the spur gear which co-operates with the helical gear shown in the preceding figure.
Figure 15:
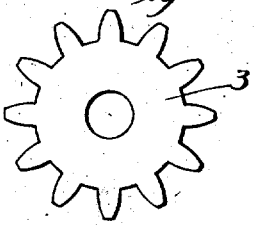

In the structure shown in the drawings, 1 is a rigid axle of the vehicle, 2 the fork of the steering knuckle thereon, 3 is the steering knuckle spindle, 4 is the steering wheel of which 5 is the hub having the flange, 5[a], for securing the spokes. 6 is a helical gear which is mounted on the steering wheel concentric therewith by means and by virtue of detail construction hereinafter described, for driving a pinion, 7, secured to the end of the rotary element, 8, of the flexible shaft, whose casing comprising the terminal ferrule, 9, thereof, is clamped for positioning the flexible shaft in the two-part clamp member, 10—11, of the bracket, of whose principal member, 12, the clamp member, 11, is a terminal part, which bracket comprises a co-operating clamp member, 13, for clamping the bracket on and adapted for adjustment about the axis of the knuckle spindle, 3. As seen in Figures 1, 4 and 5, the construction of the bracket, 11, 12, for engagement with and clamping upon the knuckle spindle is, that the clamp member, 13, is formed for hinge engagement with the member, 12, the latter having an aperture, 12[a], and the clamp member, 13 having a hook terminal, 13[a], adapted to be hooked into said aperture as seen most clearly in Figure 4, and in the hooking operation to be swung around to clasp the spindle, 3, so as to be clamped thereto by the bolts, 15, engaging the parallel positioned ends of the parts, 12 and 13, as seen in Figure 4. The parts are dimensioned so as to allow a limited range of adjustment of the clamp about the axis of the spindle for accurately meshing the spur gear, 7, with the helical gear, 6, as seen in Figure 1; and the teeth of the helical gear, beside being in helical form and arrangement as seen in Figures 2 and 13, are inclined longitudinally with respect to the plane of rotation of the gear, as seen in Figure 1, so that said gear is not only a helical crown gear, but is also a beveled crown gear, the bevel being interior. The angle of bevel is made such that when the flexible shaft which carries the spur gear, 7, trends back inwardly at an oblique angle as seen in Figure 1, for reaching the speedometer which is to be driven, substantially without curvature of said shaft at the straightahead position of the steering wheel, the plane of rotation of the spur gear is substantially at right angles to the bevel inclination of the helical teeth, $6^a$, at the midway engagement of the spur gear with said teeth. For it will be observed that in the engagement of the helical teeth of the gear, 6, with the spur gear, the teeth of the spur gear travels outwardly along the helical tooth engaged, the engagement beginning at the inner end of said helical tooth and ending by the spur gear tooth running off the outer end of the helical tooth; whereby the two gears are caused to clean each other. By relating the angle of inclination of the helical tooth to the angle of trend of the flexible shaft, as stated, it is possible to make the spur gear, 7, substantially a direct spur gear without bevel or twist.

Figure 9:
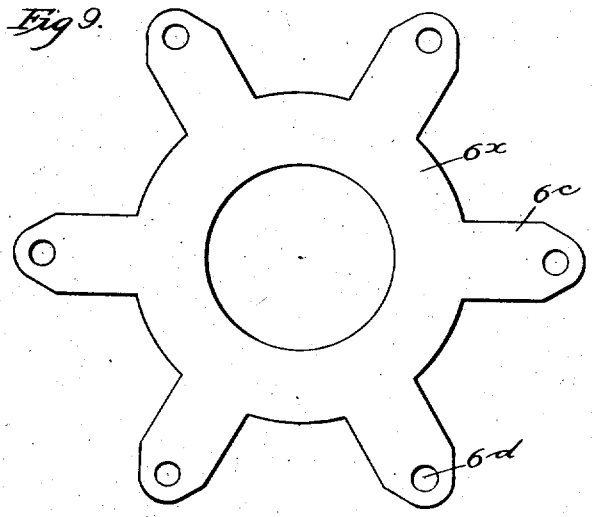
Figure 9 is a plan view of a blank from which the helical gear is formed.
Figure 7:
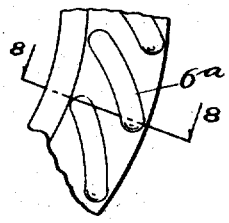
Figure 7 is a detail elevation of a small portion of the helical gear which is mounted on the steering wheel for driving.
Figure 8:
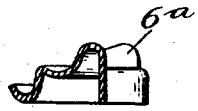
Figure 8 is a section at the line, 8—8, on Figure 7.
Figure 10:
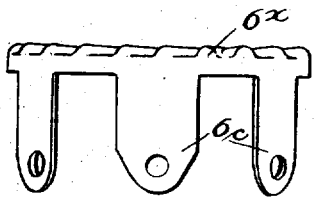
Figure 10 is an edge elevation of the same at one stage in the process of formation by stamping.
Figure 11:
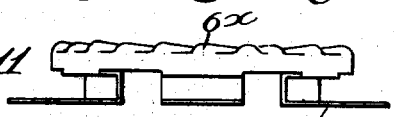
Figure 11 is an edge elevation at the later and substantially finished stage.
Figure 12:
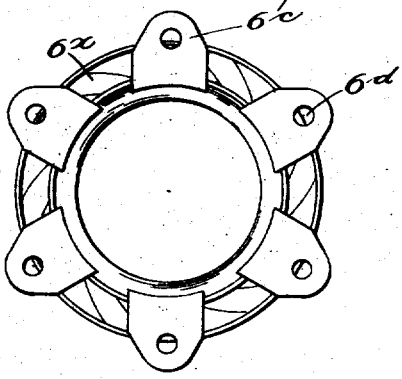
Figure 12 is a back side elevation.

For economy of construction and convenience of mounting the gear, 6, upon the steering wheel securely and at the same time accurately as to its concentricity with said steering wheel, this gear is formed by stamping from a blank shown in Figure 9, by successive steps, as may be understood from Figures 10 and 11, the blank, $6^x$, being formed with radial fingers, $6^c$, which are successively folded as shown in Figures 10 and 11, so that when the gear is completed ready for mounting upon the wheel, said fingers project radially, with respect to the gear, being offset back from the toothed face of the gear, to offset the gear from the wheel when said gear is mounted by means of said fingers on the flange, $5^a$, of the hub, being secured by means of the same bolts, $4^c$, which clamps the hub to the wheel body or spokes, the nuts, $4^d$, being temporarily removed for the purpose of engaging said fingers, $6^c$, of the gear with the bolts, respectively. And for the purpose of accurately centering the gear with respect to the steering wheel, the apertures, $6^d$, formed in the end portions of the fingers, $6^c$, for admitting the bolts are made of greater diameter than the bolts, so that within the range of play thus afforded, the gear may be adjusted accurately before tightening the nuts.

It will be understood that the flexible shaft is clamped to the bracket, 11, 12, 13, by first being lodged as to the cylindrical portion, $9^a$, of the terminal ferrule in the clamp member, 11, whereupon the clamp member, 10, is applied, and the bolt, $10^a$, tightened slightly but so that the shaft casing may be adjusted within the slight range of adjustment afforded by the excess of length of the cylindrical portion, $9^a$, beyond the width of the clamp, as seen in Figure 4, to correctly position the spur gear with respect to the helical gear; and when this is done the bolts are tightened for permanently and fixedly holding the end of the flexible shaft casing in proper position.

I claim:—

1. In a construction for the purpose indicated, a bracket adapted to be clamped on the steering knuckle spindle so as to be adjustable thereabout and having means for clamping the casing of a flexible shaft, said shaft having its casing held in said bracket; a gear on said shaft and a gear on the steering wheel with which the first mentioned gear meshes, the steering wheel gear being of the type having the teeth oblique to the plane of rotation; the bracket being mounted and adjusted on the knuckle spindle for bringing the gear on the shaft into mesh with the gear on the steering wheel at a point in the circumference of the latter at which the teeth thereof trend rearwardly inward, the parts being dimensioned for so positioning the shaft by the vertical positioning and rotative adjustment of the bracket on said steering knuckle spindle.

2. In a drive connection for a flexible shaft for driving such shaft from the steering wheel of a vehicle, a bracket for securing the flexible shaft casing to the steering knuckle spindle to fix the casing at the driven end of the shaft therein with respect to the plane of the steering wheel, comprising a unitary part which forms one member of each of two two-membered clamps, one for clamping the knuckle spindle and the other for clamping the shaft casing.

3. In the construction defined in claim 1, foregoing, the co-operating shaft member for clamping the knuckle spindle being hingedly engaged at one end with said unitary part, and bolt means for securing it at the other end.

4. In the construction defined in claim 1, foregoing, said unitary part having a slot at the inner side of the seat provided for clasping the knuckle spindle, and a co-operating member for clamping the spindle, having at one edge, a hinge lug engaging the slot, and having at the end opposite said edge holes for bolts to secure and clamp it to the unitary part.

5. In a construction for the purpose indicated, a bracket adapted to be clamped onto the steering knuckle spindle so as to be adjustable thereabout, and having means for clamping the casing of a flexible shaft, a shaft having its casing held in said bracket; a gear on said shaft and a gear on the steering wheel with which the first mentioned gear meshes, the steering wheel gear being a helically toothed crown gear; the parts being dimensioned for positioning the shaft trending inwardly at an acute angle to the plane of the steering wheel when the bracket is adjusted on the knuckle spindle for proper meshing of the gears.

6. In the construction defined in claim 4, foregoing, the crown gear being inwardly beveled, correspondingly to the trend of the driven shaft to permit the gear on said driven shaft to be a direct spur gear.

7. In a driving connection from a vehicle wheel for the purpose indicated, a sheet metal stamping crown gear member having a central aperture for admitting the wheel hub, and lugs projecting from the outer circumference of the gear-toothed annulus and folded substantially right angularly to offset said lugs back from the crown gear face and project them away from the center, said lugs being apertured for bolts to secure the crown gear to the wheel.

In testimony whereof, I have hereunto set my hand at Chicago, Illinois, this 10th day of December, 1923.

FREDERIK G. WHITTINGTON.